US011592160B2

(12) United States Patent
Chang

(10) Patent No.: US 11,592,160 B2
(45) Date of Patent: Feb. 28, 2023

(54) SWITCHABLE LAMP SHADE OR COVERING

(71) Applicant: Herman Chang, Rancho Dominguez, CA (US)

(72) Inventor: Herman Chang, Rancho Dominguez, CA (US)

( * ) Notice: Subject to any disclaimer, the term of this patent is extended or adjusted under 35 U.S.C. 154(b) by 0 days.

(21) Appl. No.: 17/701,622

(22) Filed: Mar. 22, 2022

(65) Prior Publication Data

US 2022/0214025 A1     Jul. 7, 2022

Related U.S. Application Data

(63) Continuation of application No. 16/940,191, filed on Jul. 27, 2020, now Pat. No. 11,280,478.

(60) Provisional application No. 62/878,551, filed on Jul. 25, 2019.

(51) Int. Cl.

| | |
|---|---|
| *F21V 9/40* | (2018.01) |
| *F21V 3/04* | (2018.01) |
| *G02F 1/1343* | (2006.01) |
| *G02F 1/133* | (2006.01) |
| *F21V 1/16* | (2018.01) |

(52) U.S. Cl.
CPC ............. *F21V 9/40* (2018.02); *F21V 1/16* (2013.01); *F21V 3/04* (2013.01); *G02F 1/13306* (2013.01); *G02F 1/13439* (2013.01)

(58) Field of Classification Search
CPC ..... F21V 9/40; F21V 1/16; F21V 3/04; F21V 14/003; G02F 1/13306; G02F 1/13439
See application file for complete search history.

(56) References Cited

U.S. PATENT DOCUMENTS

| | | |
|---|---|---|
| 2002/0021479 A1 | 2/2002 | Scalora |
| 2018/0314081 A1 | 11/2018 | Hoggarth et al. |

FOREIGN PATENT DOCUMENTS

| | | | | |
|---|---|---|---|---|
| CN | 206592846 U | * | 10/2017 | ................ F21S 6/00 |
| CN | 206592846 U | | 10/2017 | |
| JP | H0299921 A | | 4/1990 | |

* cited by examiner

*Primary Examiner* — Donald L Raleigh
(74) *Attorney, Agent, or Firm* — Matthew J. Spark; Stefan J. Kirchanski; Zuber Lawler LLP

(57) ABSTRACT

A lamp shade or cover that can be readily switched from a translucent-opaque mode to a transparent mode if the shade or cover from a material with transparency properties that can be modulated. A layer of liquid crystals encapsulated between transparent electrodes is included in the shade. Normally, the liquid crystals are randomly oriented and diffuse light so as to create a translucent state. When a direct current voltage is applied across the transparent electrodes, the liquid crystals become oriented and essentially transparent. Application of a pulsed or alternating current voltage can be used to modulate the degree of transparency.

8 Claims, 1 Drawing Sheet
(1 of 1 Drawing Sheet(s) Filed in Color)

SWITCHABLE LAMP SHADE OR COVERING

CROSS-REFERENCE TO PRIOR APPLICATIONS

This application is a continuation of U.S. patent application Ser. No. 16/940,191 filed on Jul. 27, 2020, which issued as U.S. Pat. No. 11,280,478 on Mar. 22, 2022, which was based on and claims benefit and priority from U.S. Provisional Patent Application No. 62/878,551 filed on 25 Jul. 2019, all of which are incorporated herein by reference.

U.S. GOVERNMENT SUPPORT

Not applicable.

BACKGROUND OF THE INVENTION

Area of the Art

The present invention relates to lighting and more specifically to an improved lamp shade or cover.

Description of the Background of the Invention

Lamp shades and lamp covers have a number of decorative and functional properties. By "lamp shade" I mean a separate structure that covers a light source such as a light bulb. Depending on the properties of the lamp shade material, a lamp shade's purpose may be primarily to diffuse and/or reflect the light rays from the light source. For example, a lamp shade may be constructed of a totally opaque (a material that light cannot pass through) material that has a white or reflective inner surface and (usually) a colored and/or textured outer surface. In that case the outer surface usually performs a decorative purpose and is color with or covered with fabric that is harmonious with the surrounding furniture. When the light source is turned on, the inner surface of the lamp shade redirects the light in a downward direction as to on a desk or table for reading purposes. It is more common that the lamp shade material not be totally opaque so that a small amount of light passes through the shade when the light source is operational. In this way the fabric or color that covers the shade is illuminated by the light source which produces a decorative effect while the shade blocks the glare of gazing directly at the light source. A "lamp cover" performs the same function but is usually considered to entirely envelop the light source without leaving a direct pat for the light rays as in the case of a light shade.

It would be desirable to produce lamp shades or covers that were capable of altering their transparency to the amount of light passing through the shade or cover could be modulated. When the shade or cover is fully transparent the light source can be seen clearly unless the shade is covered by fabric or a similar material. Seeing the source directly and without significant attenuation is advantageous where it is desired to maximally illuminate the surroundings and/or display a decorative aspect of the light source—for example a decorative "Edison-type" filament. With a fabric cover additional light will illuminate the fabric for a decorative effect. When the shade or cover is set to be opaque, less or even no light passes through and a greater amount of light is reflected from the inner surface of the shade.

SUMMARY OF THE INVENTION

A lamp shade or cover that can be readily switched from a translucent-opaque mode to a transparent mode is achieved by constructing the shade or cover from a material with transparency properties that can be modulated. Perhaps the simplest material having such properties includes a layer of liquid crystals encapsulated between transparent electrodes. In its native state the liquid crystals are randomly oriented and diffuse light so as to create a translucent state. If the layer of liquid crystals is made sufficiently thick, it will become essentially opaque. Then a direct current voltage is applied across the transparent electrodes, the liquid crystals become oriented and essentially transparent. Application of a pulsed or alternating current voltage can be used to modulate the degree of transparency. Alternatively, if the electrodes and the liquid crystals sandwiched there between are placed between crossed polarizing films, the cover will be opaque until a voltage is applied to the electrodes causing the liquid crystals to orient which rotates the polarization plane of light allowing light to pass through the crossed polarizing films. Other methods of modulating transparency include pumping or blowing particles or liquids between spaced apart transparent layers.

The application file contains at least one drawing executed in color. Copies of this patent or patent application publication with color drawing(s) will be provided by the Office upon request and payment of the necessary fee.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide lamp shades or lamp covers having a switchable or adjustable optical profile—that is, a shade capable of altering its degree of transparency.

The technology behind how transparency of the shade/cover is altered is not germane to the present invention. One way of rapidly adjusting the transparency of a shade or cover is to apply or embed a specialized liquid crystal layer to the shade cover. Such a method operates similarly to liquid crystals in the currently ubiquitous Liquid Crystal Display (LCD). In a liquid crystal film intended for transparency modulation, the liquid crystals are encapsulated between transparent electrodes. In its normal state, the liquid crystals present a milky appearance and strongly diffuse light passing through. If the layer of liquid crystals is made sufficiently thick, virtually no light will pass through. When a direct current voltage is present on the transparent electrodes, the liquid crystals become oriented by the electric field. In their oriented state, the liquid crystals do not scatter or otherwise interact with light to a significant degree and the film becomes fully transparent. Because the liquid crystals take a finite amount of time to reorient, rapidly pulsing the electric field can be used to adjust the film from full transparency (field on 100% of the time), to translucency (pulsed field with a 25% duty cycle) to fully opaque (no electric field).

Figure 1A:
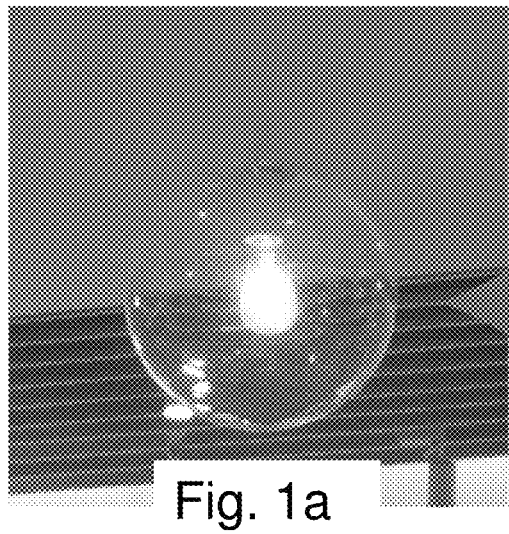
FIG. 1 shows a globe-shaped lamp cover being switched from a fully transparent mode (FIG. 1a) to a translucent mode (FIG. 1b)
Figure 1B:
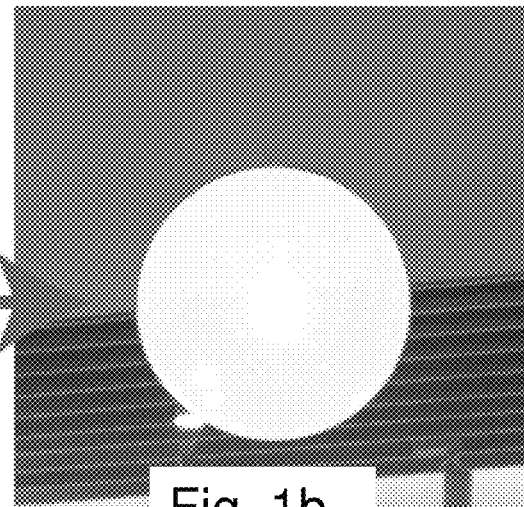

FIG. 1 shows a lamp cover (a globe surrounding a light source) being switched from a fully transparent mode (FIG. 1a) to a translucent/opaque mode (FIG. 1b). When the cover is transparent, the light source can be clearly seen, and light from the source reaches a greater distance. When in the translucent/opaque mode the light is diffused and while not reaching as far (translucent mode), provides better local illumination (translucent mode) because sharp shadows are not cast.

Figure 2A:
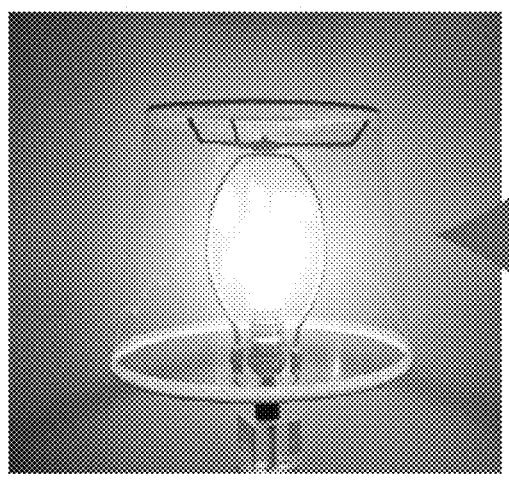
FIG. 2 shows a lamp shade being switched from a fully transparent mode (FIG. 2a) to a translucent mode (FIG. 2b).
Figure 2B:

FIG. 2 shows a conventional lamp shade being switched from a fully transparent mode (FIG. 2a) to a translucent/opaque mode (FIG. 2b). When the shade is transparent, the light source can be clearly seen and light from the source reaches a greater distance. When in the translucent/opaque mode the light is diffused and while not reaching as far, provides better local illumination (translucent mode)—particularly since the light is reflected and directed mostly in a downward direction.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A lamp shade or lamp cover for covering or enclosing a light source, comprising: a material configured to be switchable between a transparent mode, a translucent mode, and an opaque mode; wherein when the lamp shade or lamp cover is in the transparent mode, the light source can be seen through the lamp shade or lamp cover; and wherein when the lamp shade or lamp cover is in the translucent mode, the light source appears diffused seen through the lamp shade or lamp cover.

2. The lamp shade or lamp cover of claim 1, wherein the material includes encapsulated liquid crystals and transparent electrodes.

3. The lamp shade or lamp cover of claim 2, wherein a voltage is applied to the transparent electrodes to switch the material from the translucent- opaque mode to the transparent mode.

4. The lamp shade or lamp cover of claim 1, wherein the material comprises a first material, and wherein the lamp shade or cover further includes a second material configured to provide a decorative effect when illuminated by light from the light source passing through the first material.

5. A lamp shade or lamp cover for covering or enclosing a light source, comprising: a material configured to be modulated to provide varying degrees of transparency that include generally transparent, generally translucent, and generally opaque; wherein when the lamp shade or lamp cover is generally transparent, the light source can be seen through the lamp shade or lamp cover; and wherein the lamp shade or lamp cover is generally translucent, the light source appears diffused seen through the lamp shade or lamp cover.

6. The lamp shade or lamp cover of claim 5, wherein the material includes encapsulated liquid crystals and transparent electrodes.

7. The lamp shade or lamp cover of claim 6, wherein a voltage is applied to the transparent electrodes to switch the material from the translucent-opaque mode to the transparent mode.

8. The lamp shade or lamp cover of claim 6, wherein application of a pulsed or alternating current voltage to the transparent electrodes modulates the degree of transparency.

* * * * *